US010993460B2

(12) United States Patent
Teranishi et al.

(10) Patent No.: US 10,993,460 B2
(45) Date of Patent: *May 4, 2021

(54) NON-ALCOHOL, BEER-TASTE BEVERAGE HAVING SHIMARI IN TASTE

(71) Applicant: SUNTORY HOLDINGS LIMITED, Osaka (JP)

(72) Inventors: Takeshi Teranishi, Tokyo (JP); Itsuki Motohashi, Tokyo (JP)

(73) Assignee: SUNTORY HOLDINGS LIMITED, Osaka (JP)

( * ) Notice: Subject to any disclaimer, the term of this patent is extended or adjusted under 35 U.S.C. 154(b) by 474 days.

This patent is subject to a terminal disclaimer.

(21) Appl. No.: 14/442,746

(22) PCT Filed: Dec. 28, 2012

(86) PCT No.: PCT/JP2012/084062
§ 371 (c)(1),
(2) Date: May 14, 2015

(87) PCT Pub. No.: WO2014/103011
PCT Pub. Date: Jul. 3, 2014

(65) Prior Publication Data
US 2015/0313271 A1 Nov. 5, 2015

(51) Int. Cl.
*A23L 2/38* (2021.01)
*C12C 7/00* (2006.01)
*A23L 2/56* (2006.01)
*A23L 2/54* (2006.01)
*A23L 2/52* (2006.01)

(52) U.S. Cl.
CPC ........... *A23L 2/38* (2013.01); *A23L 2/52* (2013.01); *A23L 2/54* (2013.01); *A23L 2/56* (2013.01); *C12C 7/00* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 1,673,273 | A | 6/1928 | Wallerstein |
| 3,717,471 | A | 2/1973 | Sfat |
| 3,795,745 | A | 3/1974 | Brenner |
| 4,411,914 | A | 10/1983 | Devreux et al. |
| 5,264,236 | A | 11/1993 | Ogasahara et al. |
| 8,734,882 | B2 | 5/2014 | Ido et al. |
| 8,871,978 | B2 | 10/2014 | Ting et al. |
| 2002/0001651 | A1* | 1/2002 | Norris ............. A23C 9/1307 426/534 |
| 2002/0031594 | A1 | 3/2002 | Ono et al. |
| 2003/0039721 | A1 | 2/2003 | Shah et al. |
| 2004/0101591 | A1 | 5/2004 | Sato et al. |
| 2005/0058745 | A1 | 3/2005 | Mennett et al. |
| 2006/0016513 | A1 | 1/2006 | Oono et al. |
| 2006/0083819 | A1 | 4/2006 | Olsen et al. |
| 2006/0263483 | A1 | 11/2006 | Tada et al. |
| 2007/0026105 | A1 | 2/2007 | Seo et al. |
| 2007/0116801 | A1 | 5/2007 | Kowalczyk et al. |
| 2007/0254063 | A1* | 11/2007 | Aerts .................. C12C 3/08 426/11 |
| 2008/0044530 | A1 | 2/2008 | McCormick et al. |
| 2008/0063781 | A1 | 3/2008 | Kamada et al. |
| 2008/0085355 | A1 | 4/2008 | Oono et al. |
| 2008/0131555 | A1 | 6/2008 | Izumi et al. |
| 2008/0240727 | A1 | 10/2008 | Kawashima et al. |
| 2009/0016513 | A1 | 1/2009 | Miller et al. |
| 2009/0110769 | A1 | 4/2009 | Fujita et al. |
| 2010/0028486 | A1 | 2/2010 | Takahashi et al. |
| 2010/0040731 | A1 | 2/2010 | Aerts et al. |
| 2010/0291260 | A1 | 11/2010 | Bernaert |
| 2010/0310715 | A1 | 12/2010 | Kosar et al. |
| 2011/0178368 | A1 | 7/2011 | Glasel et al. |
| 2011/0288335 | A1 | 11/2011 | Ting et al. |
| 2012/0021110 | A1 | 1/2012 | Katayama |
| 2012/0121790 | A1 | 5/2012 | Murakami et al. |
| 2013/0052320 | A1 | 2/2013 | Umezawa et al. |
| 2013/0059058 | A1* | 3/2013 | Umezawa ............. A23L 2/52 426/569 |
| 2013/0196027 | A1 | 8/2013 | Hirota et al. |
| 2014/0170295 | A1 | 6/2014 | Kaneko et al. |
| 2014/0328993 | A1 | 11/2014 | Teranishi et al. |
| 2014/0342077 | A1 | 11/2014 | Teranishi et al. |

FOREIGN PATENT DOCUMENTS

| | | |
|---|---|---|
| CN | 1675350 A | 9/2005 |
| CN | 1718704 A | 1/2006 |
| CN | 1743445 A | 3/2006 |

(Continued)

OTHER PUBLICATIONS

International Search Report dated Mar. 12, 2013 for PCT/JP2012/084062.
Extended European Search Report dated Dec. 22, 2016 in EP 16187388.0.
"Low-alcohol beer," Wikipedia page, available at https://en.wikipedia.org/wiki/Low-alcohol_beer (last visited Jan. 12, 2017).
International Preliminary Report on Patentability dated May 27, 2014 in PCT/JP/2012/072314.
International Preliminary Report on Patentability dated May 27, 2014 in PCT/JP/2012/072316.
International Preliminary Report on Patentability dated May 27, 2014 in PCT/JP/2012/072312.
International Preliminary Report on Patentability dated May 27, 2014 in PCT/JP/2012/079973.
International Preliminary Report on Patentability dated Jun. 30, 2015 in PCT/JP/2012/084062.

(Continued)

*Primary Examiner* — Amber R Orlando
*Assistant Examiner* — Stephanie A Cox
(74) *Attorney, Agent, or Firm* — Faegre Drinker Biddle & Reath LLP

(57) ABSTRACT

The present invention aims to provide a non-alcohol, beer-taste beverage having Shimari in taste.
It provides a non-alcohol beer-taste beverage having a weight ratio of the polyphenol(s) to the total amount of the extract component(s) in a specific range.

20 Claims, No Drawings

(56) References Cited

FOREIGN PATENT DOCUMENTS

| | | | |
|---|---|---|---|
| CN | 1764724 A | 4/2006 |
| CN | 100335606 C | 9/2007 |
| CN | 101505617 A | 8/2009 |
| CN | 101875899 A | 11/2010 |
| EP | 0 307 052 A1 | 3/1989 |
| EP | 1 063 285 A1 | 12/2000 |
| EP | 1 363 989 A1 | 9/2003 |
| EP | 1544285 A1 | 6/2005 |
| EP | 1829957 A1 | 9/2007 |
| EP | 2 004 793 A1 | 10/2007 |
| EP | 2 380 449 A1 | 10/2011 |
| EP | 2 385 100 A1 | 11/2011 |
| EP | 2 454 952 A1 | 5/2012 |
| GB | 1384309 A | 2/1975 |
| GB | 2039947 A | 8/1980 |
| GB | 2454558 A | 5/2009 |
| JP | H01-165358 A | 6/1989 |
| JP | H02-117377 A | 5/1990 |
| JP | H04-173082 A | 6/1992 |
| JP | H04-287677 A | 10/1992 |
| JP | H05-068529 | 3/1993 |
| JP | H11-127839 A | 5/1999 |
| JP | 2001037462 A | 2/2001 |
| JP | 2001095541 A | 4/2001 |
| JP | 2003-250503 A | 9/2003 |
| JP | 2003245064 A | 9/2003 |
| JP | 2004-536604 A | 12/2004 |
| JP | 2005-025989 A | 1/2005 |
| JP | 2005013166 A | 1/2005 |
| JP | 2005-519971 A | 7/2005 |
| JP | 2005-295989 A | 10/2005 |
| JP | 2006045061 A | 2/2006 |
| JP | 2006109794 A | 4/2006 |
| JP | 2007-029075 A | 2/2007 |
| JP | 2007-054049 A | 3/2007 |
| JP | 2007124960 A | 5/2007 |
| JP | 2007-174967 A | 7/2007 |
| JP | 2008043231 A | 2/2008 |
| JP | 2008268898 A | 11/2008 |
| JP | 2009011200 A | 1/2009 |
| JP | 2009-142233 A | 7/2009 |
| JP | 2009-531046 A | 9/2009 |
| JP | 2009-532042 A | 9/2009 |
| JP | 2010-098985 A | 5/2010 |
| JP | 2010124732 A | 6/2010 |
| JP | 2010-284153 A | 12/2010 |
| JP | 2010279349 A | 12/2010 |
| JP | 2011-019471 A | 2/2011 |
| JP | 2011-072228 A | 4/2011 |
| JP | 2011-139687 A | 7/2011 |
| JP | 2011-142901 A | 7/2011 |
| JP | 2011139671 A | 7/2011 |
| JP | 2011139699 A | 7/2011 |
| JP | 2011188833 A | 9/2011 |
| JP | 2011229538 A | 11/2011 |
| JP | 2013021944 A | 2/2013 |
| JP | 5314220 B1 | 10/2013 |
| RU | 2325435 C2 | 5/2008 |
| RU | 2373270 C2 | 11/2009 |
| SU | 537632 A3 | 11/1976 |
| SU | 1010116 A1 | 4/1983 |
| TW | 200626713 | 8/2006 |
| WO | WO-9302177 A1 | 2/1993 |
| WO | WO-03063614 A1 | 8/2003 |
| WO | WO-2004106483 A1 | 12/2004 |
| WO | WO-2007082703 A1 | 7/2007 |
| WO | WO-2007/099915 A1 | 9/2007 |
| WO | WO-2007/115499 A1 | 10/2007 |
| WO | WO-2008024657 A2 | 2/2008 |
| WO | WO-20080018627 A1 | 2/2008 |
| WO | WO-2010-056225 A1 | 5/2010 |
| WO | WO-2011007475 A1 | 1/2011 |
| WO | WO-2011/145670 A1 | 11/2011 |
| WO | WO-2011/145671 A1 | 11/2011 |

OTHER PUBLICATIONS

Hideo Miyachi, Beer Brewing Technology, Shokuhin Sangyo Shimbunsha Co. Ltd. , Dec. 28, 1999, pp. 40, 49 (partial translation attached).
Aron, et al., "A Discussion of Polyphenols in Beer Physical and Flavour Stability", Journal of the Institute of Brewing, Oct. 9 2010, vol. 116, No. 4, pp. 369-380.
EP 12852231.5—Extended (Supplementary) European Search Report dated Aug. 5, 2015.
International Search Report dated Dec. 4, 2012 for PCT/JP2012/072312.
EP Application No. 12851438.7—Extended European Search Report dated Jul. 23, 2015.
International Search Report dated Nov. 13, 2012 for PCT/JP2012/072314.
EP Application No. 12852123.4—Extended (Supplementary) European Search Report dated Jul. 31, 2015.
EP 12851267.0—Extended European Search Report dated Sep. 8, 2015.
International Search Report dated Feb. 19, 2013 for PCT/JP2012/079973.
Nishinippon Shinbun, "Maji Maji = Non-alcoholic Beer Kanzen Zero Kohyo Shosen Gekika Chumon Kyozo Shukka Yokusei mo Sikisha 'Izonsho Chiryo ni Eikyo'", Aug. 19, 2010, evening paper, p. 1.
Shukan Asahi, "Kakusha no Nomikuchi o Tettei Hikaku Osaka no Pro no Megane ni Kanau nowa Dore? Non-alcoholic Inryo", Nov. 4, 2011, p. 35.
International Search Report dated Oct. 9, 2012 for PCT/JP2012/072316.
Page 45 of English-German-Japanese Brewer's Dictionary, published on Feb. 15, 2004.
Partial English translation of Yukiaki Natsume, "Why the third beers have a beer-taste?" Jan. 10, 2010, p. 40.
Beer Analysis Methods of BCOJ (Nov. 1, 2004 Revised ed.) 7.2 Extracts.
Decision rendered in *Suntory Holdings Limited* v *Asahi Breweries, Limited,* Case No. Heisei 27 (wa) 1025 rendered Oct. 29, 2015 (30 pages) with an English Translation (31 pages).
First Brief by Defendant in Case No. Heisei 27 (wa) 1025.
Second Brief by Defendant in Case No. Heisei 27 (wa) 1025.
Third Brief by Defendant in Case No. Heisei 27 (wa) 1025.
Fourth Brief by Defendant in Case No. Heisei 27 (wa) 1025.
Petition filed in Case No. Heisei 27 (wa) 1025.
Description of Evidence 1 submitted by the Defendant in Case No. Heisei 27 (wa) 1025.
Description of Evidence 2 submitted by the Defendant in Case No. Heisei 27 (wa) 1025.
Description of Evidence 3 submitted by the Defendant in Case No. Heisei 27 (wa) 1025.
Description of Evidence 4 submitted by the Defendant in Case No. Heisei 27 (wa) 1025.
Written Answer submitted in Case No. Heisei 27 (wa) 1025.
Exhibit B-1—Measurement Report filed by the Defendant in Case No. Heisei 27 (wa) 1025.
Exhibit B-2—Revised BCOJ Beer Analysis Method (Section 7.2 Extract) with a partial English Translation submitted by the Defendant in Case No. Heisei 27 (wa) 1025.
Exhibit B-3—Written Amendment submitted by the Defendant in Case No. Heisei 27 (wa) 1025.
Exhibit B-4—Hard Copy of the website featuring Sutory's News Release submitted by the Defendant in Case No. Heisei 27 (wa) 1025.
Exhibit B-5—Japanese Patent No. 2009-142233 published on Jul. 2, 2009 with an English abstract submitted by the Defendant in Case No. Heisei 27 (wa) 1025.
Exhibit B-6—Japanese Patent No. H11-127839 published on May 18, 1999 with an English abstract submitted by the Defendant in Case No. Heisei 27 (wa) 1025.

(56) References Cited

OTHER PUBLICATIONS

Exhibit B-7—Japanese Patent No. 2010-279349 published on Dec. 16, 2010 with an English abstract submitted by the Defendant in Case No. Heisei 27 (wa) 1025.
Exhibit B-8—Japanese Patent No. 2007-124960 published on May 24, 2007 with an English abstract submitted by the Defendant in Case No. Heisei 27 (wa) 1025.
Exhibit B-9—Hard copy of website featuring Asahi's new release submitted by the Defendant in Case No. Heisei 27 (wa) 1025.
Exhibit B-10—Article from the Nikkei Marketing Journal, Nov. 19, 2010 submitted by the Defendant in Case No. Heisei 27 (wa) 1025.
Exhibit B-11—"Developement of non-alcoholic beer-taste beverages," Journal of Cookery Science of Japan, vol. 44, No. 3, p. 257, submitted by the Defendant in Case No. Heisei 27 (wa) 1025.
Exhibit B-12—Nutrition Labeling Standards submitted by the Defendant in Case No. Heisei 27 (wa) 1025.
Exhibit B-13—U.S. Pat. No. 3,717,471 issued Feb. 20, 1973 submitted by the Defendant in Case No. Heisei 27 (wa) 1025.
Exhibit B-14—Japanese Patent No. 2008-043231 published Feb. 28, 2008 submitted by the Defendant in Case No. Heisei 27 (wa) 1025.
Exhibit B-14—WO Patent No. 2008-0018627, published Feb. 14, 2008, is the English counterpart to Japanese Patent No. 2008-043231 submitted by the Defendant in Case No. Heisei 27 (wa) 1025.
Exhibit B-15—Japanese Patent No. 2005-013166 published Jan. 1, 2015 with an English abstract submitted by the Defendant in Case No. Heisei 27 (wa) 1025.
Exhibit B-16—Japanese Patent No. 2011-142901 published Jul. 28, 2011 with an English abstract submitted by the Defendant in Case No. Heisei 27 (wa) 1025.
Exhibit B-17—Japanese Patent No. 2013-021944 published Feb. 4, 2013 submitted by the Defendant in Case No. Heisei 27 (wa) 1025.
Exhibit B-17—U.S. Patent Application Publication No. 2014/170295, published Jun. 19, 2014, is the English counterpart to Japanese Patent No. 2013-021944 submitted by the Defendant in Case No. Heisei 27 (wa) 1025.
Exhibit B-18-1—Letter directed to the Defendant Re your product "Asahi Dry Zero" submitted by the Defendant in Case No. Heisei 27 (wa) 1025.
Exhibit B-18-2—Letter direct to the Plaintiff submitted by the Defendant in Case No. Heisei 27 (wa) 1025.
Exhibit B-18-3—Letter directed to the Defendant submitted by the Defendant in Case No. Heisei 27 (wa) 1025.
Exhibit B-18-4—Letter directed to the Plaintiff submitted by the Defendant in Case No. Heisei 27 (wa) 1025.
Exhibit B-18-5—Letter directed to the Defendent Re your product "Asahi Dry Zero" submitted by the Defendant in Case No. Heisei 27 (wa) 1025.
Exhibit B-18-6—Letter directed to the Plaintiff submitted by the Defendant in Case No. Heisei 27 (wa) 1025.
Exhibit B-18-7—Letter directed to the Defendant Re "Asahi Dry Zero" (a new version with improved quality) submitted by the Defendant in Case No. Heisei 27 (wa) 1025.
Exhibit B-18-8—Letter directed to the Plaintiff submitted by the Defendant in Case No. Heisei 27 (wa) 1025.
Exhibit B-18-9—Letter directed to the Defendant Re "Asahi Dry Zero" (a new version with improved quality) submitted by the Defendant in Case No. Heisei 27 (wa) 1025.
Exhibit B-18-10—Letter direct to the Plaintiff submitted by the Defendant in Case No. Heisei 27 (wa) 1025.
Exhibit B-18-11—Notice submitted by the Defendant in Case No. Heisei 27 (wa) 1025.
Exhibit B-18-12—Reply submitted by the Defendant in Case No. Heisei 27 (wa) 1025.
Exhibit B-19—Standard and critiera for carbonated drinks, etc. submitted by the Defendant in Case No. Heisei 27 (wa) 1025.
Exhibit B-20—"Report" submitted by the Defendant in Case No. Heisei 27 (wa) 1025.
Exhibit B-21—Jouzou Hakkou Syokuhim no Jiten (Dictionary of Brewed and Fermented Foods) submitted by the Defendant in Case No. Heisei 27 (wa) 1025.
Exhibit B-22—Official Analysis Method of the National Tax Agency of Japan submitted by the Defendant in Case No. Heisei 27 (we) 1025.
Exhibit B-23—Syuzei Hourei Tuttstsusyuu (Collection of Laws, Regulations and Directives related to Liquor Tax) submitted by the Defendant in Case No. Heisei 27 (wa) 1025.
Exhibit B-24—Japanese Patent No. 2008-043231 published Feb. 28, 2008 submitted by the Defendant in Case No. Heisei 27 (wa) 1025.
Exhibit B-24—WO Patent No. 2008-0018627, published Feb. 14, 2008, is the English counterpart to Japanese Patent No. 2008-043231 submitted by the Defendant in Case No. Heisei 27 (wa) 1025.
Exhibit B-25—Japanese Patent No. 2003-250503 published on Sep. 9, 2003 with an English abstract submitted by the Defendant in Case No. Heisei 27 (wa) 1025.
Exhibit B-26—Japanese Patent No. 2011-139699 published on Sep. 21, 2011 with an English abstract submitted by the Defendant in Case No. Heisei 27 (wa) 1025.
Exhibit B-27—Japanese Patent No. 2009-011200 published on Jan. 22, 2009 with an English abstract submitted by the Defendant in Case No. Heisei 27 (wa) 1025.
Exhibit B-28-1—"Biere der Welt" with an English translation submitted by the Defendant in Case No. Heisei 27 (wa) 1025.
Exhibit B-28-1—Hard copy of website featuring "Biere der Welt. Eine Enzyklopadie von Anton Piendl" submitted by the Defendant in Case No. Heisei 27 (wa) 1025.
Exhibit B-29—Japanese Patent No. 2011-229538 published on Nov. 17, 2011 submitted by the Defendant in Case No. Heisei 27 (wa) 1025.
Exhibit B29—U.S. Patent Application Publication No. 2006/0263483, published on Nov. 23, 2006, is the English counterpart to Japanese Patent No. 2011-229538 submitted by the Defendant in Case No. Heisei 27 (wa) 1025.
Exhibit B-31-1—Japanese Patent No. 2006-045061 published on Feb. 16, 2006 with an English abstract submitted by the Defendant in Case No. Heisei 27 (wa) 1025.
Exhibit B-31-2—Japanese Patent No. 2006-109794 published on Apr. 27, 2006 with an English abstract submitted by the Defendant in Case No. Heisei 27 (wa) 1025.
Exhibit B-31-3—Japanese Patent No. 2008-268898 published on Nov. 6, 2008 submitted by the Defendant in Case No. Heisei 27 (wa) 1025.
Exhibit B-31-3—U.S. Patent Application Publication No. 2008/0240727, published on Oct. 2, 2008, is the English counterpart to Japanese Patent No. 2008-268898 submitted by the Defendant in Case No. Heisei 27 (wa) 1025.
Exhibit B-38—WO Patent No. 2011-145670 published on Nov. 24, 2011 submitted by the Defendant in Case No. Heisei 27 (wa) 1025.
Exhibit B-38—U.S. Patent Application Publication No. 2013/0059058, published on Mar. 7, 2013, is the English counterpart to WO Patent No. 2011-145670 submitted by the Defendant in Case No. Heisei 27 (wa) 1025.
Exhibit B-40—Japanese Patent No. 5314220B1 published on Jul. 12, 2013 submitted by the Defendant in Case No. Heisei 27 (wa) 1025.
Exhibit B-40—U.S. Patent Application Publication No. 2014/0328993, published on Nov. 6, 2014, is the English counterpart to Japanese Patent No. 5314220 submitted by the Defendant in Case No. Heisei 27 (wa) 1025.
Exhibit B-41-1—Appendix 1 Analysis Data submitted by the Defendant in Case No. Heisei 27 (wa) 1025.
Exhibit B-41-2—Appendix 1 Analysis Data submitted by the Defendant in Case No. Heisei 27 (wa) 1025.
Exhibit B-41-3—Appendix 1 Analysis Data submitted by the Defendant in Case No. Heisei 27 (wa) 1025.
Exhibit B-42—Appeal Decision (Appeal Docket No. 2014-390088) submitted by the Defendant in Case No. Heisei 27 (wa) 1025.

(56) References Cited

OTHER PUBLICATIONS

Exhibit B-43—Enlarged 5th Edition of Standard Tables of Food Composition in Japan—Book of Materials, pp. 224-225 submitted by the Defendant in Case No. Heisei 27 (wa) 1025.
Exhibit B-44—Handbook of Dietary Fiber submitted by the Defendant in Case No. Heisei 27 (wa) 1025.
EP Application No. 12890956.1—Extended European Search Report dated May 30, 2016.
Beer Analysis Methods of BCOJ (Nov. 1, 2004 Revised ed.) 7.2 Extracts (w/ partial English translation).
"Do alcoholic and non-alcoholic beer taste the same?" available at https://www.quora.com/Do-alcoholic-and-non-alcoholic-beer-taste-the-same (last visited Dec. 21, 2017).
Aging of Hops and Their Contribution to Beer Flavor, Kai C. Lam, Robert T. Foster II, and Max L. Deinzer, J. Agrlc. Food Chem. 1988, 34, 763-770.

\* cited by examiner

NON-ALCOHOL, BEER-TASTE BEVERAGE HAVING SHIMARI IN TASTE

CROSS REFERENCE TO RELATED APPLICATIONS:

This application is the National Stage of International Application No. PCT/JP2012/084062, filed Dec. 28, 2012.

TECHNICAL FIELD

The present invention provides a non-alcohol, beer-taste beverage comprising a predetermined amount of a polyphenol(s), the production method of the same and wort used in the production.

BACKGROUND ART

Malt and hops are essential ingredients in producing beer. Polyphenols derived from malt and hops add richness to beer, and Shimari in the taste. Aromatic components derived from hops add a delightful flavor to the beer. Further, bitter components derived from hops add a crisp bitterness and excellent foam retention.

The bitterness of beer is affected by the weight ratio of malt and hops. In relation to this, Non-Patent Document 1 reports in p. 78 to 79 that decreasing the amount of hops in a rich-tasting beer obtained using a large quantity of malt leads to a beer that is unpleasant to drink due to the lack of Shimari in taste and an undesirable snappiness; and increasing the amount of hops in beer with relatively bland taste obtained using a small quantity of malt leads to a beer with an unbalanced flavor characterized by strong bitterness. Hence, it is common to increase the amount of hops in a rich-tasting beer obtained using a large quantity of malt, and to decrease the amount of hops in beer with relatively bland taste, when producing beer.

The recent health consciousness of consumers is increasing the demand for non-alcohol beer-taste beverages, that is, beverages with 0.00% alcohol. Since fermentation produces alcohol, non-alcohol beer-taste beverages are often produced without fermenting the ingredients. Patent Document 1 describes that vegetable protein hydrolysates and a malt extract are used as ingredients to produce a non-fermented, beer-flavored, carbonated drink that is essentially free of ethanol, having a beer-like bitterness and richness, as well as thickness and unity in flavor.

CITATION LIST

Patent Documents

Patent Document 1: Japanese patent application unexamined publication No. 2011-142901

Non-Patent Documents

Non-Patent Document 1: Junji Watari "Biru no Kagaku (Science of Beer)", Jun. 4, 2010, $7^{th}$ issue, Kodansha.

SUMMARY OF INVENTION

Technical Problem

Through production of non-alcohol beer-taste beverages using malt and hops at a weight ratio normally adopted in beer production, it was found that the resulting beverage had less Shimari in taste. This is a problem specific to non-alcohol beer-taste beverages produced without fermentation.

The present invention aims to provide a non-alcohol beer-taste beverage with Shimari in taste.

Solution to Problem

In view of the above situation, the present inventors conducted intensive studies and found that raising the hop to malt weight ratio in beer to a level presumed to produce an unbalanced flavor characterized by strong astringency unexpectedly produces a non-alcohol beer-taste beverage with a well-balanced flavor. This finding was a surprising one, completely beyond expectation. Based on this finding, the inventors found that by making the weight ratio of a polyphenol(s) to the total amount of an extract component(s) in non-alcohol beer-taste beverages fall in a specific range, it is possible to add Shimari in taste to the non-alcohol beer-taste beverage without causing an unbalanced flavor characterized by strong astringency; and completed the invention.

The present invention provides a non-alcohol beer-taste beverage, a production method thereof and wort used in the production according to (1) to (26).

(1) A non-alcohol beer-taste beverage wherein a weight ratio of a polyphenol(s) to a total amount of an extract component(s) (percentage by weight of the polyphenol(s)/percentage by weight of the total amount of the extract component(s)) is from $20 \times 10^{-4}$ to $50 \times 10^{-4}$ inclusive.

(2) The non-alcohol beer-taste beverage according to (1), wherein the weight ratio of the polyphenol(s) to the total amount of the extract component(s) (percentage by weight of the polyphenol(s)/percentage by weight of the total amount of the extract component(s)) is from $20 \times 10^{-4}$ to $40 \times 10^{-4}$ inclusive.

(3) The non-alcohol beer-taste beverage according to (1), wherein the weight ratio of the polyphenol(s) to the total amount of the extract component(s) (percentage by weight of the polyphenol(s)/percentage by weight of the total amount of the extract component(s)) is from $20 \times 10^{-4}$ to $30 \times 10^{-4}$ inclusive.

(4) The non-alcohol beer-taste beverage according to any one of (1) to (3), wherein the total amount of the extract component(s) is from 0.1 to 2% by weight inclusive.

(5) The non-alcohol beer-taste beverage according to (4), wherein the total amount of the extract components(s) is from 0.1 to 1% by weight inclusive.

(6) The non-alcohol beer-taste beverage according to (4), wherein the total amount of the extract component(s) is from 0.1 to 0.5% by weight inclusive.

(7) The non-alcohol beer-taste beverage according to (4), wherein the total amount of the extract component(s) is from 0.1 to 0.35% by weight inclusive.

(8) The non-alcohol beer-taste beverage according to any one of (1) to (7), wherein the extract component(s) include a mugi-derived extract component(s).

(9) The non-alcohol beer-taste beverage according to any one of (1) to (8) having a calorie content of from 0.4 to 8 kcal/100 ml inclusive.

(10) The non-alcohol beer-taste beverage according to (9) having a calorie content of from 0.4 to 4 kcal/100 ml inclusive.

(11) The non-alcohol beer-taste beverage according to (9) having a calorie content of from 0.4 to 2 kcal/100 ml inclusive.

(12) The non-alcohol beer-taste beverage according to (9) having a calorie content of from 0.4 to 1.4 kcal/100 ml inclusive.

(13) The non-alcohol beer-taste beverage according to any one of (1) to (12) having a saccharide content of from 0.1 to 2.0 g/100 ml inclusive.

(14) The non-alcohol beer-taste beverage according to (13) having a saccharide content of from 0.1 to 1.0 g/100 ml inclusive.

(15) The non-alcohol beer-taste beverage according to (13) having a saccharide content of from 0.1 to 0.5 g/100 ml inclusive.

(16) The non-alcohol beer-taste beverage according to (13) having a saccharide content of from 0.1 to 0.35 g/100 ml inclusive.

(17) The non-alcohol beer-taste beverage according to any one of (1) to (16), which is a non-fermented, non-alcohol beer-taste beverage.

(18) Wort having a weight ratio of a polyphenol(s) to a total amount of an extract component(s) (percentage by weight of the polyphenol(s)/percentage by weight of the total amount of the extract component(s)) that is from $20 \times 10^{-4}$ to $50 \times 10^{-4}$ inclusive.

(19) The wort according to (18), wherein the weight ratio of the polyphenol(s) to the total amount of the extract component(s) (percentage by weight of the polyphenol(s)/percentage by weight of the total amount of the extract component(s)) is from $20 \times 10^{-4}$ to $40 \times 10^{-4}$ inclusive.

(20) The wort according to (18), wherein the weight ratio of the polyphenol(s) to the total amount of the extract component(s) (percentage by weight of the polyphenol(s)/percentage by weight of the total amount of the extract component(s)) is from $20 \times 10^{-4}$ to $30 \times 10^{-4}$ inclusive.

(21) A production method for producing a non-alcohol beer-taste beverage comprising a step of adding a seasoning component and carbon rich gas to wort having a weight ratio of a polyphenol(s) to the total amount of an extract component(s) (percentage by weight of the polyphenol(s)/percentage by weight of the total amount of the extract component(s)) that is from $20 \times 10^{-4}$ to $50 \times 10^{-4}$ inclusive.

(22) The production method according to (21) wherein the weight ratio of the polyphenol(s) to the total amount of the extract component(s) (percentage by weight of the polyphenol(s)/percentage by weight of the total amount of the extract component(s)) is from $20 \times 10^{-4}$ to $40 \times 10^{-4}$ inclusive.

(23) The production method according to (21), wherein the weight ratio of the polyphenol(s) to the total amount of the extract component(s) (percentage by weight of the polyphenol(s)/percentage by weight of the total amount of the extract component(s)) is from $20 \times 10^{-4}$ to $30 \times 10^{-4}$ inclusive.

(24) The production method according to any one of (21) to (23), using wort obtained by adding pelletized hops to a wort filtrate and boiling the wort filtrate.

(25) The production method according to any one of (21) to (24), wherein the beer-taste beverage is a non-fermented, non-alcohol beer-taste beverage.

(26) The production method according to any one of (21) to (25) for producing a non-alcohol beer-taste beverage according to any one of (1) to (17).

Advantageous Effects of Invention

The present invention can add Shimari in taste to the non-alcohol beer-taste beverage without causing an unbalanced flavor characterized by strong astringency.

DESCRIPTION OF EMBODIMENTS

<Non-Alcohol Beer-Taste Beverage>

As one aspect, the present invention provides a non-alcohol beer-taste beverage. In particular, in the present specification, the non-alcohol beer-taste beverage can be a non-fermented beer-taste beverage. The non-alcohol beer-taste beverage of the present invention comprises a polyphenol(s). Polyphenols are important in terms of flavor in the present invention, since they can add Shimari in taste to the non-alcohol beer-taste beverage. Hence, hops having a high polyphenol content are preferable for use, since they will increase the total polyphenol content of the non-alcohol beer-taste beverage. Pelletized hops include more polyphenols than hop extracts, so they suit the use in the present invention.

The polyphenol content of the non-alcohol beer-taste beverage of the present invention can be defined by its weight ratio to the total amount of the extract component(s). The weight ratio of the polyphenol(s) to the total amount of the extract component(s) affects the advantageous effects of the present invention, which are to prevent the beverage from having strong astringency and also to add Shimari in taste to the beverage. Accordingly, the weight ratio can vary as long as it is in a range that does not hinder the advantageous effects of the present invention. The weight ratio of the polyphenol(s) to the total amount of the extract component(s) in the non-alcohol beer-taste beverage (percentage by weight of the polyphenol(s)/percentage by weight of the total amount of the extract component(s)) of the present invention can have a range defined by any combination of a lower limit of $20 \times 10^{-4}$ or higher, preferably $21 \times 10^{-4}$ or higher, more preferably $22 \times 10^{-4}$ or higher, even more preferably $23 \times 10^{-4}$ or higher, and most preferably $24 \times 10^{-4}$ or higher and a higher limit of $50 \times 10^{-4}$ or lower, preferably $40 \times 10^{-4}$ or lower, more preferably $35 \times 10^{-4}$ or lower, even more preferably $30 \times 10^{-4}$ or lower, still more preferably $29 \times 10^{-4}$ or lower, still even more preferably $28 \times 10^{-4}$ or lower, more preferably $27 \times 10^{-4}$ or lower, more preferably $26 \times 10^{-4}$ or lower, and most preferably $25 \times 10^{-4}$. For example, the weight ratio of the polyphenol(s) to the total amount of the extract component(s) (percentage by weight of the polyphenol(s)/percentage by weight of the total amount of the extract component(s)) can be from $20 \times 10^{-4}$ to $50 \times 10^{-4}$ inclusive, preferably from $20 \times 10^{-4}$ to $40 \times 10^{-4}$ inclusive, more preferably from $20 \times 10^{-4}$ to $35 \times 10^{-4}$ inclusive. In addition, the weight ratio of the polyphenol(s) to the total amount of the extract component(s) (percentage by weight of the polyphenol(s)/percentage by weight of the total amount of the extract component(s)) can be from $20 \times 10^{-4}$ to $50 \times 10^{-4}$ inclusive, preferably from $20 \times 10^{-4}$ to $40 \times 10^{-4}$ inclusive, more preferably from $20 \times 10^{-4}$ to $35 \times 10^{-4}$ inclusive, even more preferably from $20 \times 10^{-4}$ to $30 \times 10^{-4}$ inclusive, still more preferably from $20 \times 10^{-4}$ to $29 \times 10^{-4}$ inclusive, still even more preferably from $20 \times 10^{-4}$ to $28 \times 10^{-4}$ inclusive, more preferably from $21 \times 10^{-4}$ to $28 \times 10^{-4}$ inclusive, more preferably from $22 \times 10^{-4}$ to $28 \times 10^{-4}$ inclusive, more preferably from $22 \times 10^{-4}$ to $27 \times 10^{-4}$ inclusive, more preferably from $23 \times 10^{-4}$ to $27 \times 10^{-4}$ inclusive, more preferably from $23 \times 10^{-4}$ to $26 \times 10^{-4}$ inclusive, especially preferably from $24 \times 10^{-4}$ to $26 \times 10^{-4}$ inclusive, most preferably from $24 \times 10^{-4}$ to $25 \times 10^{-4}$ inclusive. No existing non-alcohol beer-taste beverage is found to contain polyphenols at the above weight ratio.

A non-alcohol beer-taste beverage with a weight ratio of the polyphenol(s) to the total amount of the extract component(s) that is lower than $20 \times 10^{-4}$ is undesirable, since, although its astringency is not so strong, its taste will lack Shimari. On the other hand, a non-alcohol beer-taste beverage with a weight ratio of the polyphenol(s) to the total amount of the extract component(s) that is higher than $50 \times 10^{-4}$ is also not desirable, since, although it has Shimari in taste, its astringency will be undesirably strong.

The term "Shimari" used with regard to a taste in the present specification refers to the unity of the taste and the snappiness of the taste.

The term "beer-taste beverages" as used herein refers to carbonated drinks having a beer-like flavor. Thus, unless otherwise noted, beer-taste beverages as referred to herein embrace all types of carbonated drinks with a beer flavor whether or not they are produced via a yeast-based fermentation step. The present invention is directed to a particular type, non-alcoholic type, for example, unfermented non-alcoholic type, of these beverages, which is substantially free of alcohol. It should be noted here that beverages which contain alcohol in a trace amount that is too small to be detected are within the scope of the beverages of the present invention. Included within the scope of the non-alcohol beverage of the present invention are beverages the alcohol content of which is calculated to be 0.0%, in particular, 0.00% by counting fractions of 5 and over as a unit and cutting away the rest. Since it is difficult to completely remove alcohol from beverages that has been fermented by yeast, a beverage with alcohol at a level of 0.00% by counting fractions of 5 and over as a unit and cutting away the rest, should preferably be produced by a method that is exclusive of fermentation. In the present specification, the term "non-fermented" or "exclusive of fermentation" refers to the lack of decomposition of organic matters by microorganism, and it specifically refers to the lack of alcohol developing from decomposition of organic matters by yeast. Exemplary types of the non-alcoholic beer-taste beverages of the present invention include non-fermented, non-alcohol, beer-taste beverages, beer-taste soft drinks, and the like.

The alcohol content in the beer-taste beverage in the present specification is the content of alcohol in the beverage (v/v %); the alcohol can be measured using any known method, specifically using an oscillating densimeter. A specific example is provided below. The beverage is filtered or subjected to ultrasonication to prepare a sample that is free of carbon rich gas. The sample was put under direct fire for distillation to obtain a distilled solution, and the density of the solution was measured at 15° C. "Table 2 Conversion Table for Alcohol and Density (15° C.) and Specific Gravity (15/15° C.)" in the appendix table to the Predetermined Analysis Method of the National Tax Agency (Directive No. 6 of the National Tax Agency in 2007, revised Jun. 22, 2007) was used to convert the above measurement to obtain the alcohol content in the beverage. Further, if the alcohol is at a low concentration (e.g. lower than 1.0 v/v %), it can be measured using a commercial alcohol measurement device or gas chromatography or the like.

Polyphenols in the present specification include polyphenols derived from mugi or hops, and polyphenols added as an additive. Polyphenols derived from mugi include catechin, prodelphinidin $B_3$, and procyanidin $B_3$. Polyphenols derived from hops include catechin, procyanidin $B_3$, and procyanidin $C_2$. Polyphenols added as an additive can be any approved food additives including green tea polyphenols, oolong tea polyphenols, and apple polyphenols. The non-alcohol beer-taste beverage of the present invention includes a polyphenol(s) derived from mugi and a polyphenol(s) derived from hops. A polyphenol content can be measured by any commonly known method. Measurement in the present invention is performed according to the "Beer Analysis Methods of BCOJ (2004.11.1 Revised ed.) 7.11 Total Polyphenol" specified by the Brewery Convention of Japan (BCOJ) of Brewers Association of Japan unless otherwise mentioned.

Any hops used in the production of beer and the like can be used in the present specification by selecting one or more hops from processed hops according to the purpose of use, such as dried hop cone, pelletized hops, powder hops, hop extracts and isomerized hops, hexa-hops, tetra-hops. Hops can be in any form, but hops with a high polyphenol content are desirable, and pelletized hops are preferable.

The total amount of the extract component(s) as mentioned in the present specification is the sum of the extract component(s) contained in the non-alcohol beer-taste beverage, and it can be measured according to the "Beer Analysis Methods of BCOJ (2004.11.1 Revised ed.) 7.2 Extracts".

In the non-alcohol beer-taste beverage of the present invention, the total amount of the extract component(s) affects the foam formed on the surface of the non-alcohol beer-taste beverage. A specific range of the total amount of the extract component(s) provides a sufficient quality, especially high foam retention, to the foam formed on the surface, so it is preferable in terms of providing a beer-like appearance. The total amount of the extract component(s) in the non-alcohol beer-taste beverage of the present invention can be in the range defined by any combination of a lower limit of 0.1% by weight or higher, preferably 0.2% by weight or higher, and an upper limit of 2% by weight or lower, preferably 1% by weight or lower, more preferably 0.8% by weight or lower, even more preferably 0.6% by weight or lower, still more preferably 0.5% by weight or lower, still even more preferably 0.4% by weight or lower, more preferably 0.35% by weight or lower, and most preferably 0.3% by weight or lower. The total amount of the extract component(s) in the non-alcohol beer-taste beverage of the present invention can be from 0.1 to 2% by weight inclusive, preferably from 0.1 to 1% by weight inclusive, more preferably from 0.1 to 0.5% by weight inclusive. Further examples of the range include the total amounts of the extract component(s) in the non-alcohol beer-taste beverage of the present invention of from 0.1 to 2% by weight inclusive, preferably from 0.1 to 1% by weight inclusive, more preferably from 0.1 to 0.8% by weight inclusive, even more preferably from 0.1 to 0.6% by weight inclusive, still more preferably from 0.1 to 0.5% by weight inclusive, still even more preferably from 0.1 to 0.4% by weight inclusive, more preferably from 0.1 to 0.35% by weight inclusive, more preferably from 0.1 to 0.3% by weight inclusive, and most preferably from 0.2 to 0.3% by weight inclusive.

The above mentioned extract components may contain a mugi-derived extract component(s). The mugi-derived extract component(s) in the present specification may be any extract component(s) derived from mugi, such as malt, and mugi of any origin can be used as a source. The total amount of the extract component(s) derived from mugi may be determined for their amount by subtracting the amounts, as separately determined, of additives and extract components derived from other ingredients, from the amounts of all extract components. The total content of the mugi-derived extract component(s) relative to the non-alcohol beer-taste beverage of the present invention can be in the range defined by any combination of a lower limit of 0.1% by weight or higher, preferably 0.2% by weight or higher, and an upper limit of 2% by weight or lower, preferably 1% by weight or lower, more preferably 0.8% by weight or lower, even more preferably 0.6% by weight or lower, still more preferably 0.5% by weight or lower, still even more preferably 0.4% by weight or lower, more preferably 0.35% by weight or lower, and most preferably 0.3% by weight. The total content of the mugi-derived extract component(s) relative to the non-alcohol beer-taste beverage of the present invention can be from 0.1 to 2% by weight inclusive, preferably from 0.1 to 1% by weight inclusive, more preferably from 0.1 to 0.5% by weight inclusive. Further exemplary ranges of the total content of the mugi-derived extract component(s) relative to the non-alcohol beer-taste beverage include from 0.1 to 2% by weight inclusive, preferably from 0.1 to 1% by weight inclusive, more preferably from 0.1 to 0.8% by weight inclusive, even more preferably from 0.1 to 0.6% by weight inclusive, still more preferably from 0.1 to 0.5% by weight inclusive, still even more preferably from 0.1 to 0.4% by weight inclusive, more preferably from 0.1 to 0.35% by weight inclusive, more preferably from 0.1 to 0.3% by weight inclusive, and most preferably from 0.2 to 0.3% by weight inclusive.

The term "mugi" as used herein means mugi that is commonly employed in producing beers and happoshu. The above mugi means Poaceae grains with similar appearances. It includes barley, wheat, rye, karasumugi (white oats), oat, hatomugi (Job's tears), embaku (oats), and the one preferably used is barley. A single type can be used alone or two or more types can be combined for use. The above mugi may or may not be germinated, but germinated mugi is preferable in the present invention. Malt is more preferable among the germinated mugi. Malt as mentioned in the present specification is a product obtained by drying the sprouts of mugi, and removing their roots.

The calorie content of the non-alcohol beer-taste beverage of the present invention can be in the range of any combination of a lower limit that is 0.4 kcal or higher, preferably 0.8 kcal or higher, and an upper limit of 8 kcal or lower, preferably 4 kcal or lower, more preferably 3.2 kcal or lower, even more preferably 2.4 kcal or lower, still more preferably 2 kcal or lower, still even more preferably 1.6 kcal or lower, more preferably 1.4 kcal or lower, and most preferably 1.2 kcal or lower, per 100 ml of the beverage. The calorie content in the non-alcohol beer-taste beverage of the present invention can be from 0.4 to 8 kcal inclusive, preferably from 0.4 to 4 kcal inclusive, more preferably from 0.4 to 2 kcal inclusive, per 100 ml of beverage. Further exemplary ranges of the calorie content in non-alcohol beer-taste beverage are from 0.4 to 8 kcal inclusive, preferably from 0.4 to 4 kcal inclusive, more preferably from 0.4 to 3.2 kcal inclusive, even more preferably from 0.4 to 2.4 kcal inclusive, still more preferably from 0.4 to 2 kcal inclusive, still even more preferably from 0.4 to 1.6 kcal inclusive, more preferably from 0.4 to 1.4 kcal inclusive, more preferably from 0.4 to 1.2 kcal inclusive, and most preferably from 0.8 to 1.2 kcal inclusive, per 100 ml of the beverage.

The calorie content in the beverages is calculated basically in accordance with "On Analysis Methods, etc. for Nutrients, etc. Listed in the Nutrition Labelling Standards" as published in association with the Health Promotion Act.

In other words, as a rule, the calorie can be obtained by multiplying the quantified amount of each nutrient with its energy conversion factor (protein: 4 kcal/g, fat: 9 kcal/g, saccharide: 4 kcal/g, dietary fiber: 2 kcal/g, alcohol: 7 kcal/g, organic acid: 3 kcal/g) and totaling the products. For details, see "On Analysis Methods, etc. for Nutrients, etc. Listed in the Nutrition Labelling Standards."

Specific techniques for measuring the amounts of the respective nutrients contained in beverages may comply with the various methods of analysis described in "On Analysis Methods, etc. for Nutrients, etc. Listed in the Nutrition Labelling Standards" as a supplement to the Health Promotion Act. Alternatively, the Japan Food Research Laboratories (Foundation) will provide such calorific values and/or the amounts of the respective nutrients upon request.

The non-alcohol beer-taste beverage of the present invention comprises saccharides. The term "saccharides" as used herein refers to ones based on the Nutrition Labelling Standards for Foods (Health, Labor and Welfare Ministry Notice No. 176 in 2003). Saccharide includes monosaccharides and oligosaccharides such as disaccharides, trisaccharides, tetrasaccharides to decasaccharides, and monosaccharides and disaccharides are preferable in the present invention. Monosaccharides include glucose, fructose, galactose, and mannose. Disaccharides include sucrose, lactose, maltose, trehalose, cellobiose. The saccharide content of the non-alcohol beer-taste beverage of the present invention can be in a range of any combination of a lower limit of 0.1 g/100 ml or higher, preferably 0.2 g/100 ml or higher, and a higher limit of 2.0 g/100 ml or lower, preferably 1.0 g/100 ml or lower, more preferably 0.8 g/100 ml or lower, even more preferably 0.6 g/100 ml or lower, still more preferably 0.5 g/100 ml or lower, still even more preferably 0.4 g/100 ml or lower, even more preferably 0.35 g/100 ml or lower, and most preferably 0.3 g/100 ml or lower. For example, the saccharide content of the non-alcohol beer-taste beverage of the present invention can be from 0.1 to 2.0 g/100 ml inclusive, preferably from 0.1 to 1.0 g/100 ml inclusive, more preferably from 0.1 to 0.5 g/100 ml inclusive. Further exemplary ranges of the saccharide contents of the non-alcohol beer-taste beverage are from 0.1 to 2.0 g/100 ml inclusive, preferably from 0.1 to 1.0 g/100 ml inclusive, more preferably from 0.1 to 0.8 g/100 ml inclusive, even more preferably from 0.1 to 0.6 g/100 ml inclusive, still more preferably from 0.1 to 0.5 g/100 ml inclusive, still even more preferably from 0.1 to 0.4 g/100 ml inclusive, more preferably from 0.1 to 0.35 g/100 ml inclusive, more preferably from 0.1 to 0.3 g/100 ml inclusive, and most preferably from 0.2 to 0.3 g/100 ml inclusive.

The saccharide content can be obtained by subtracting the amount of protein, fat, dietary fiber, ash, alcohol and water from the weight of the entire beverage. The protein, fat, dietary fiber, ash and water can be measured by the methods in the Nutrition Labeling Standards. Specifically, the mass of protein can be measured by the nitrogen determination and conversion method. The amount of fat can be measured by the ether extracting method, chloroform-methanol mixture extracting method, the Gerber method, the acid hydrolysis method, or the Roese-Gottlieb method. The amount of dietary fiber can be measured by the high performance liquid chromatography method or the ashing method with added sulfuric acid. The amount of water can be measured using the Karl Fischer technique, the drying aid method, a method of heating and drying under reduced pressure, a method of heating and drying under normal pressure, or a plastic film method. These measurement methods are commonly known among persons skilled in the art.

As another aspect, the present invention provides wort having a weight ratio of the polyphenol(s) to the total amount of the extract component(s) in a specific range. The wort can be obtained by boiling the wort filtrate after mashing. The wort can be preferably used in the production of a non-alcohol beer-taste beverage which has Shimari in taste and whose astringency is not so strong.

The weight ratio of the polyphenol(s) to the total amount of the extract component(s) in the wort of the present invention can be in a range that does not hinder the advantageous effects of the present invention. The weight ratio of the polyphenol(s) to the total amount of the extract component(s) in the wort in the present invention (percentage by weight of the polyphenol(s)/percentage by weight of the total amount of the extract component(s)) can be in a range of any combination of a lower limit of $20 \times 10^{-4}$ or higher, preferably $21 \times 10^{-4}$ or higher, more preferably $22 \times 10^{-4}$ or higher, even more preferably $23 \times 10^{-4}$ or higher, still more preferably $24 \times 10^{-4}$ or higher, and an upper limit of $50 \times 10^{-4}$ or lower, preferably $40 \times 10^{-4}$ or lower, more preferably $35 \times 10^{-4}$ or lower, even more preferably $30 \times 10^{-4}$ or lower, still more preferably $29 \times 10^{-4}$ or lower, still even more preferably $28 \times 10^{-4}$ or lower, more preferably $27 \times 10^{-4}$ or lower, more preferably $26 \times 10^{-4}$ or lower, and most preferably $25 \times 10^{-4}$ or lower. For example, the weight ratio of the polyphenol(s) to the total amount of the extract component(s) in the present invention (percentage by weight of the polyphenol(s)/percentage by weight of the total amount of the extract component(s)) can be from $20 \times 10^{-4}$ to $50 \times 10^{-4}$ inclusive, preferably from $20 \times 10^{-4}$ to $40 \times 10^{-4}$ inclusive, more preferably from $20 \times 10^{-4}$ to $35 \times 10^{-4}$ inclusive. Further exemplary ranges of the weight ratio of the polyphenol(s) to the total amount of the extract component(s) in the present invention (percentage by weight of the polyphenol(s)/percentage by weight of the total amount of the extract component(s)) can be from $20 \times 10^{-4}$ to $50 \times 10^{-4}$ inclusive, preferably from $20 \times 10^{-4}$ to $40 \times 10^{-4}$ inclusive, more preferably from $20 \times 10^{-4}$ to $35 \times 10^{-4}$ inclusive, even more preferably from $20 \times 10^{-4}$ to $30 \times 10^{-4}$ inclusive, still more preferably from $20 \times 10^{-4}$ to $29 \times 10^{-4}$ inclusive, still even more preferably from $20 \times 10^{-4}$ to $28 \times 10^{-4}$ inclusive, more preferably from $21 \times 10^{-4}$ to $28 \times 10^{-4}$ inclusive, more preferably from $22 \times 10^{-4}$ to $28 \times 10^{-4}$ inclusive, more preferably from $22 \times 10^{-4}$ to $27 \times 10^{-4}$ inclusive, more preferably from $23 \times 10^{-4}$ to $27 \times 10^{-4}$ inclusive, more preferably from $23 \times 10^{-4}$ to $26 \times 10^{-4}$ inclusive, especially more preferably from $24 \times 10^{-4}$ to $26 \times 10^{-4}$ inclusive, and most preferably from $24 \times 10^{-4}$ to $25 \times 10^{-4}$ inclusive. No existing wort is found to contain the polyphenol(s) at the above weight ratio.

A non-alcohol beer-taste beverage with a weight ratio of the polyphenol(s) to the total amount of the extract component(s) that is lower than $20 \times 10^{-4}$ is undesirable, since, although its astringency is not so strong, its taste will lack Shimari. On the other hand, a weight ratio of the polyphenol(s) to the total amount of the extract component(s) that is higher than $50 \times 10^{-4}$ is also not desirable, since, although it adds Shimari in taste to the non-alcohol beer-taste beverage, its astringency will be undesirably strong.

Further, the extract component(s) in the wort of the present invention can contain an extract component(s) derived from mugi. When the mugi-derived extract component(s) are contained, the total content of the mugi-derived extract component(s) can be in a range of any combination of a lower limit of 0.1% by weight or higher, preferably 0.2% by weight or higher, and an upper limit of 2% by weight or lower, preferably 1% by weight or lower, more preferably 0.8% by weight or lower, even more preferably 0.6% by weight or lower, still more preferably 0.5% by weight or lower, still even more preferably 0.4% by weight or lower, more preferably 0.35% by weight or lower, and most preferably 0.3% by weight or lower. The total content of the mugi-derived extract component(s) can be from 0.1 to 2% by weight inclusive, preferably from 0.1 to 1% by weight inclusive, and more preferably from 0.1 to 0.5% by weight inclusive. Further exemplary ranges of the total content of the mugi-derived extract component(s), when such mugi-derived extract component(s) are contained, are from 0.1 to 2% by weight inclusive, preferably from 0.1 to 1% by weight inclusive, more preferably from 0.1 to 0.8% by weight inclusive, even more preferably from 0.1 to 0.6% by weight inclusive, even more preferably from 0.1 to 0.5% by weight inclusive, still more preferably from 0.1 to 0.4% by weight inclusive, still even more preferably from 0.1 to 0.35% by weight inclusive, more preferably from 0.1 to 0.3% by weight inclusive, and most preferably from 0.2 to 0.3% by weight inclusive. The total amount of the extract component(s) in wort can be measured according to the "Beer Analysis Methods of BCOJ (2004.11.1 Revised ed.) 7.2 Extracts".

A non-alcohol beer-taste beverage can be obtained by adding degassed water, carbon rich gas, seasoning components and the like to the wort of the present invention. That is, the wort of the present invention is useful as an intermediate to produce a non-alcohol beer-taste beverage. The wort can be stored in the storage tank, container and the like until its use. The wort can be stored at a normal temperature (25° C.) or lower, but it is preferable to cool wort during storage to suppress degradation. Wort is cooled herein at, for example, 20° C. or lower, preferably 15° C. or lower, and more preferably 10° C. or lower. Cooled wort is referred to particularly as cold wort. One embodiment of the use of wort in the present invention comprises processes of producing wort in a factory as an intermediate of a non-alcohol beer-taste beverage, filling the wort in a refrigerating container, delivering it to other factories in this country or abroad, and producing a non-alcohol beer-taste beverage.

<Production Method of Non-Alcohol Beer-Taste Beverage>

As another aspect, the present invention provides a production method of non-alcohol beer-taste beverage. Any means can be used in the production method as long as the weight ratio of the polyphenol(s) to the total amount of the extract component(s) in the non-alcohol beer-taste beverage produced is in a specific range. For example, the production method of non-alcohol beer-taste beverage of the present invention comprises a wort preparation step and a product preparation step.

The wort preparation step as defined in the present specification comprises a mashing step, which includes a saccharification step and a proteolysis step, a wort-filtering step, and a wort-boiling step.

The mashing step includes a saccharification step and a proteolysis step. The saccharification step mentioned herein is a step of suspending and dissolving the carbon source and/or the nitrogen source, that is derived from malt and the like crushed in a pulverizer, in water to decompose saccharides such as starch to generate sugar. The proteolysis step is a step of decomposing protein, peptide and the like to generate amino acids and oligopeptides.

The mashing step is typically carried out by mixing raw materials such as malt and water, and processing the mixture at a given temperature for a given time. When using malt as the raw material, the malt should be crushed malt.

The conditions of processing in the mashing step can be set so that the saccharide content in wort obtained through the wort preparation step or the saccharide content in the non-alcohol beer-taste beverage obtained through the wort preparation step and the product preparation step is in a range of any combination of a lower limit of 0.1 g/100 ml or higher, preferably 0.2 g/100 ml or higher, and an upper limit of 2.0 g/100 ml or lower, preferably 1.0 g/100 ml or lower, more preferably 0.8 g/100 ml or lower, even more preferably 0.6 g/100 ml or lower, still more preferably 0.5 g/100 ml or lower, still even more preferably 0.4 g/100 ml or lower, more preferably 0.35 g/100 ml or lower, and most preferably 0.3 g/100 ml or lower. The conditions of processing in the mashing step can be for example set so that the saccharide content in wort obtained through the wort preparation step or the saccharide content in the non-alcohol beer-taste beverage obtained through the wort preparation step and the product preparation step is from 0.1 to 2.0 g/100 ml inclusive, preferably from 0.1 to 1.0 g/100 ml inclusive, more preferably from 0.1 to 0.5 g/100 ml inclusive. For example, the conditions of processing in the mashing step can further be set so that the saccharide content in wort obtained through the wort preparation step or the saccharide content in the non-alcohol beer-taste beverage obtained through the wort preparation step and the product preparation step is from 0.1 to 2.0 g/100 ml inclusive, preferably from 0.1 to 1.0 g/100 ml inclusive, more preferably from 0.1 to 0.8 g/100 ml inclusive, even more preferably from 0.1 to 0.6 g/100 ml inclusive, still more preferably from 0.1 to 0.5 g/100 ml inclusive, still even more preferably from 0.1 to 0.4 g/100 ml inclusive, more preferably from 0.1 to 0.35 g/100 ml inclusive, more preferably from 0.1 to 0.3 g/100 ml inclusive, and most preferably from 0.2 to 0.3 g/100 ml inclusive. A suitable mashing pattern can be selected for the temperature of the mashing step according to the flavor design of the marketable product. In the mashing step, an inherent enzyme derived from malt can be used alone, or in combination with carbohydrase which is added to increase the saccarification efficiency and to obtain the desired saccharide composition.

Secondary ingredients can also be added in the mashing step. Any material commonly used in producing beer can be used as the secondary ingredient, such as corn starch, corn grits, and rice.

The wort filtration step in the present specification is a step of filtering the mash after the mashing step.

The wort-boiling step mentioned in the present specification is a step of adding hops to a filtrate that is obtained by the wort filtration step, and boiling the mixture. Hops should preferably be added before the start of boiling, at the same time as the start of boiling, or immediately after the start of boiling. Hops can be added all at once, or in successive portions. Polyphenols can be added during the wort-boiling step, prior to the step of obtaining wort or non-alcohol beer-taste beverage, to make the polyphenol content in the obtained wort or non-alcohol beer-taste beverage fall in a desired range. For example, the amount of hops to be added can be adjusted so that polyphenols derived from the hops are added in a desired amount. Or, polyphenols that can be added as an additive can be added. Such polyphenols include catechin, prodelphinidin $B_3$, and procyanidin $B_3$, procyanidin $C_2$, green tea polyphenols, oolong tea polyphenols, and an apple polyphenols.

The boiling condition in the wort-boiling step is set so that the weight ratio of the polyphenol(s) to the total amount of the extract component(s) falls within a specific range. The weight ratio of the polyphenol(s) to the total amount of the extract component(s) in wort after boiling (percentage by weight of the polyphenol(s)/percentage by weight of the total amount of the extract component(s)) can be in a range of any combination of a lower limit of $20 \times 10^{-4}$ or higher, preferably $21 \times 10^{-4}$ or higher, more preferably $22 \times 10^{-4}$ or higher, even more preferably $23 \times 10^{-4}$ or higher, still more preferably $24 \times 10^{-4}$ or higher, and an upper limit of $50 \times 10^{-4}$ or lower, preferably $40 \times 10^{-4}$ or lower, more preferably $35 \times 10^{-4}$ or lower, even more preferably $30 \times 10^{-4}$ or lower, even more preferably $29 \times 10^{-4}$ or lower, even more preferably $28 \times 10^{-4}$ or lower, still more preferably $27 \times 10^{-4}$ or lower, even more preferably $26 \times 10^{-4}$ or lower, and most preferably $25 \times 10^{-4}$ or lower. That is, the boiling condition can typically be set so that the weight ratio of the polyphenol(s) to the total amount of the extract component(s) in wort after boiling (percentage by weight of the polyphenol(s)/percentage by weight of the total amount of the extract component(s)) is from $20 \times 10^{-4}$ to $50 \times 10^{-4}$ inclusive, preferably from $20 \times 10^{-4}$ to $40 \times 10^{-4}$ inclusive, more preferably from $20 \times 10^{-4}$ to $35 \times 10^{-4}$ inclusive. For example, the boiling condition can further be set so that the weight ratio of the polyphenol(s) to the total amount of the extract component(s) in wort after boiling (percentage by weight of the polyphenol(s)/percentage by weight of the total amount of the extract component(s)) is from $20 \times 10^{-4}$ to $50 \times 10^{-4}$ inclusive, preferably from $20 \times 10^{-4}$ to $40 \times 10^{-4}$ inclusive, more preferably from $20 \times 10^{-4}$ to $35 \times 10^{-4}$ inclusive, even more preferably from $20 \times 10^{-4}$ to $30 \times 10^{-4}$ inclusive, still more preferably from $20 \times 10^{-4}$ to $29 \times 10^{-4}$ inclusive, still even more preferably from $20 \times 10^{-4}$ to $28 \times 10^{-4}$ inclusive, more preferably from $21 \times 10^{-4}$ to $28 \times 10^{-4}$ inclusive, more preferably from $22 \times 10^{-4}$ to $28 \times 10^{-4}$ inclusive, more preferably from $22 \times 10^{-4}$ to $27 \times 10^{-4}$ inclusive, more preferably from $23 \times 10^{-4}$ to $27 \times 10^{-4}$ inclusive, more preferably from $23 \times 10^{-4}$ to $26 \times 10^{-4}$ inclusive, especially preferably from $24 \times 10^{-4}$ to $26 \times 10^{-4}$ inclusive, most preferably from $24 \times 10^{-4}$ to $25 \times 10^{-4}$ inclusive.

In addition, ingredients other than hops can be added during the wort-boiling step. Such ingredients include ingredients commonly used in producing beer, such as colorants, flavors and the like.

Wort can be prepared by performing the above wort-boiling step. The weight ratio of the polyphenol(s) to the total amount of the extract component(s) in wort (percentage by weight of the polyphenol(s)/percentage by weight of the total amount of the extract component(s)) can be in a range of any combination of a lower limit $20 \times 10^{-4}$ or higher, preferably $21 \times 10^{-4}$ or higher, more preferably $22 \times 10^{-4}$ or higher, even more preferably $23 \times 10^{-4}$ or higher, still more preferably $24 \times 10^{-4}$ or higher, and an upper limit of $50 \times 10^{-4}$ or lower, preferably $40 \times 10^{-4}$ or lower, more preferably $35 \times 10^{-4}$ or lower, even more preferably $30 \times 10^{-4}$ or lower, still more preferably $29 \times 10^{-4}$ or lower, still even more preferably $28 \times 10^{-4}$ or lower, more preferably $27 \times 10^{-4}$ or lower, more preferably $26 \times 10^{-4}$ or lower, and most preferably $25 \times 10^{-4}$ or lower. The wort is prepared with a weight ratio of the polyphenol(s) to the total amount of the extract component(s) (percentage by weight of the polyphenol(s)/percentage by weight of the total amount of the extract component(s)), for example, from $20 \times 10^{-4}$ to $50 \times 10^{-4}$ inclusive, preferably from $20 \times 10^{-4}$ to $40 \times 10^{-4}$ inclusive, and more preferably from $20 \times 10^{-4}$ to $35 \times 10^{-4}$ inclusive. Further examples of the weight ratio of the polyphenol(s) to the total amount of the extract component(s) (percentage by weight of the polyphenol(s)/percentage by weight of the total amount of the extract component(s)) of the wort are from $20 \times 10^{-4}$ to $50 \times 10^{-4}$ inclusive, preferably from $20 \times 10^{-4}$ to $40 \times 10^{-4}$ inclusive, more preferably from $20 \times 10^{-4}$ to $35 \times 10^{-4}$ inclusive, even more preferably from $20 \times 10^{-4}$ to $30 \times 10^{-4}$ inclusive, still more preferably from $20 \times 10^{-4}$ to $29 \times 10^{-4}$ inclusive, still even more preferably from $20 \times 10^{-4}$ to $28 \times 10^{-4}$ inclusive, more preferably from $21 \times 10^{-4}$ to $28 \times 10^{-4}$ inclusive, more preferably from $22 \times 10^{-4}$ to $28 \times 10^{-4}$ inclusive, more preferably from $22 \times 10^{-4}$ to $27 \times 10^{-4}$ inclusive, more preferably from $23 \times 10^{-4}$ to $27 \times 10^{-4}$ inclusive, more preferably from $23 \times 10^{-4}$ to $26\times10^{-4}$ inclusive, especially preferably from $24\times10^{-4}$ to $26\times10^{-4}$ inclusive, most preferably from $24\times10^{-4}$ to $25\times10^{-4}$ inclusive.

The total amount of the extract component(s) in the wort can be in a range of any combination of a lower limit of 0.1% by weight or higher, preferably 0.2% by weight or higher, and an upper limit of 2% by weight or lower, preferably 1% by weight or lower, more preferably 0.8% by weight or lower, even more preferably 0.6% by weight or lower, still more preferably 0.5% by weight or lower, still even more preferably 0.4% by weight or lower, more preferably 0.35% by weight or lower, and most preferably 0.3% by weight or lower. The total amount of the extract component(s) in wort is for example from 0.1 to 2% by weight inclusive, preferably from 0.1 to 1% by weight inclusive, more preferably from 0.1 to 0.5% by weight inclusive. Further examples of the total amount of the extract component(s) are from 0.1 to 2% by weight inclusive, preferably from 0.1 to 1% by weight inclusive, more preferably from 0.1 to 0.8% by weight inclusive, even more preferably from 0.1 to 0.6% by weight inclusive, still more preferably from 0.1 to 0.5% by weight inclusive, still even more preferably from 0.1 to 0.4% by weight inclusive, more preferably from 0.1 to 0.35% by weight inclusive, more preferably from 0.1 to 0.3% by weight inclusive, and most preferably from 0.2 to 0.3% by weight inclusive.

The total content of the mugi-derived extract component(s) relative to wort can be in a range of any combination of a lower limit of 0.1% by weight or higher, preferably 0.2% by weight or higher, and an upper limit of 2% by weight or lower, preferably 1% by weight or lower, more preferably 0.8% by weight or lower, even more preferably 0.6% by weight or lower, still more preferably 0.5% by weight or lower, still even more preferably 0.4% by weight or lower, more preferably 0.35% by weight or lower, and most preferably 0.3% by weight or lower. The total content of the mugi-derived extract component(s) in wort is typically from 0.1 to 2% by weight inclusive, preferably from 0.1 to 1% by weight inclusive, more preferably from 0.1 to 0.5% by weight inclusive. Further examples of the total content of the mugi-derived extract component(s) in wort are from 0.1 to 2% by weight inclusive, preferably from 0.1 to 1% by weight inclusive, more preferably from 0.1 to 0.8% by weight inclusive, even more preferably from 0.1 to 0.6% by weight inclusive, still more preferably from 0.1 to 0.5% by weight inclusive, still even more preferably from 0.1 to 0.4% by weight inclusive, more preferably from 0.1 to 0.35% by weight inclusive, more preferably from 0.1 to 0.3% by weight inclusive, and most preferably from 0.2 to 0.3% by weight inclusive.

The above wort can be stored until it is used in the next product preparation step. Wort can be stored in a storage tank, a container and the like at a normal temperature (25° C.) or lower, but it is preferable to cool wort during storage. The wort can be cooled herein at, for example, 20° C. or lower, preferably 15° C. or lower, and more preferably 10° C. or lower.

The product preparation step as used herein is a step of preparing a non-alcohol beer-taste beverage using wort obtained through the wort-boiling step. Seasoning components and carbon acid gas can be added to the wort. The taste of the non-alcohol beer-taste beverage can be adjusted to any taste by adding the seasoning components. Seasoning components include acidulants, flavors, and sweeteners. Preservatives, such as Vitamin C, can be added as necessary. Subsequently, wort can be kept still and further filtered, as necessary, to obtain the non-alcohol beer-taste beverage.

The above mentioned production method of non-alcohol beer-taste beverage is suitable for application to the production of non-alcohol beer-taste beverage of the present invention.

<Other Components>

Components that are approved as food additives can be used in the present invention as long as it does not hinder the advantageous effects of the present invention. Examples include sweeteners, various acidulants, flavors, yeast extracts, colorants such as caramel colors, saponin-based substances extracted from plants such as soybean saponin or quillaja saponin, plant protein- and peptide-containing substances such as corn, soybean, or fava been, proteinaceous substances such as bovine serum albumin, seasoning agents such as dietary fiber or amino acids, antioxidants such as ascorbic acid.

<Beverages Packed in Containers>

Non-alcohol beer-taste beverages of the present invention can be packed in containers. Containers of any shape or material can be used; specifically, bottles, cans, kegs, PET bottles or other containers can be filled with the beverage and sealed.

EXAMPLES

The present invention is described in more detail by the Examples, without being limited in scope by the Examples.

<Production of Non-Alcohol Beer-Taste Beverages>

Non-alcohol beer-taste beverages of the present invention whose weight ratio of the polyphenol(s) to the total amount of the extract component(s) are in the desired range (Examples 1 to 7) and non-alcohol beer-taste beverages whose weight ratio of the polyphenol(s) to the total amount of the extract component(s) are outside the desired scope (Comparative Examples 1 to 3) were produced by the following method.

Concerning Examples 1 to 7 and Comparative Examples 1 to 3, 20 kg of malt was crushed to an appropriate grain size and put in a tank for preparation, then 120 L of warm water was added to form a mash of about 50° C. The mash was kept at 50° C. for 30 minutes, followed by a gradual increase in the temperature to between 65° C. and 72° C. to conduct saccharification for 60 minutes. The mash after saccharification has completed was heated to 77° C., then transferred to the wort filtering tank for filteration to obtain a filtrate.

Warm water was added to a portion of the obtained filtrate. The mixture ratio of the filtrate and warm water was conditioned so that the total amount of the extract component(s) at the end of the boiling is 0.4% by weight for Examples 2 to 5 and Comparative Examples 1 and 3, 0.1% by weight for Example 1, 1% by weight for Example 6, 2% by weight for Example 7, 0.05% by weight for Comparative Example 2.

The mixtures of filtrate and warm water were each adjusted to a production scale of 100 L, and boiled at 100° C. for 80 minutes after hops were added to it. The amounts of extract hops and pelletized hops added were adjusted, while the bitterness unit was kept the same, to produce many wort samples having the same total amount of the extract components and different total polyphenol amounts (referred to hereinafter as the original wort samples). Lees were separated from the boiled solution, and the remnant was cooled to about 2° C., then original wort samples whose total amounts of the extract component(s) are the same were mixed and conditioned to obtain conditioned wort samples having the desired amounts of polyphenols.

Appropriate amounts of antioxidants, flavors, and acidulants (added in an amount that makes pH to be less than 4) were added to the conditioned wort samples before the wort <Assessment of Saccharides>

Saccharides were measured using the equation given in the the Nutrition Labelling Standards for Foods (Health, Labor and Welfare Ministry Notice No. 176 in 2003).

<Assessment of Quality>

The flavor assessment result of Examples 1 to 7 and Comparative Examples 1 to 3 is shown in Table 1 below.

TABLE 1

|  | Examples | | | | | | | Comp. Ex | | |
| --- | --- | --- | --- | --- | --- | --- | --- | --- | --- | --- |
|  | 1 | 2 | 3 | 4 | 5 | 6 | 7 | 1 | 2 | 3 |
| Total amount of extract components (wt %) | 0.1 | 0.4 | 0.4 | 0.4 | 0.4 | 1 | 2 | 0.4 | 0.05 | 0.4 |
| total polyphenol amount (ppm) | 2 | 8 | 12 | 16 | 20 | 40 | 40 | 5 | 1 | 26 |
| weight ratio of polyphenols to total amount of extract components | $20 \times 10^{-4}$ | $20 \times 10^{-4}$ | $30 \times 10^{-4}$ | $40 \times 10^{-4}$ | $50 \times 10^{-4}$ | $40 \times 10^{-4}$ | $20 \times 10^{-4}$ | $12.5 \times 10^{-4}$ | $20 \times 10^{-4}$ | $65 \times 10^{-4}$ |
| calorie (kcal/100 ml) | 0.4 | 1.6 | 1.6 | 1.6 | 1.6 | 4 | 8 | 1.6 | 0.2 | 1.6 |
| saccharides (g/100 ml) | 0.1 | 0.4 | 0.4 | 0.4 | 0.4 | 1.0 | 2.0 | 0.4 | 0.05 | 0.4 |
| Shimari | ○ | ○ | ○ | ○ | ○ | ○ | ○ | x | Δ | ○ |
| astringency | X | X | X | X | X | X | X | X | X | ○ | samples were stored for about 24 hours. Carbon acid gas was appropriately added in the process. Then, the mixture was subjected to filtration and sterilization (heated at 65° C. or higher for 10 minutes) to obtain non-alcohol beer-taste beverages of the present invention (Examples 1 to 7) and non-alcohol beer-taste beverages (Comparative Examples 1 to 3).

The bitterness unit was measured according to the "Beer Analysis Methods BCOJ (2004.11.1 Revised ed.) 7.12 Bitterness Units". Acid was added to the degassed sample, which was then extracted by isooctane. The absorbance of the obtained isooctane layer was measured against a control of pure isooctane at 275 nm, then the value was multiplied to a factor to obtain the bitterness unit (BU).

The polyphenol content was measured using "Beer Analysis Methods of BCOJ (2004.11.1 Revised ed.) 7.11 Total Polyphenol".

<Assessment of Flavor>

The flavor of the non-alcohol beer-taste beverage in the present specification was assessed using a sensory test based on the rating system. Five well-trained sensory panelists rated the existence of "Shimari in the taste" and "astringency" on a scale of 1 to 4. The ratings according to the following system were averaged: "identifiable"=4, "moderately identifiable"=3, "weakly identifiable"=2, "not identifiable"=1. Then, a separate rating scale of 1 to 3 was set forth according to the obtained average.

Average value 1.0 or higher to lower than 2.0 X;
Average value 2.0 or higher to lower than 3.0 Δ;
Average value 3.0 or higher to 4.0 or lower ○.

<Assessment of the Extract Components>

The extract components in the beverage was assessed in the Examples by the following method. That is, the extract components were measured according to "Beer Analysis Methods of BCOJ (2004.11.1 Revised ed.) 7.2 Extracts".

<Assessment of Calories>

The calorie was calculated according to the "On Analysis Methods, etc. for Nutrients, etc. Listed in the Nutrition Labelling Standards" as published in association with the Health Promotion Act.

As shown in Table 1, Shimari in the taste was sensed when the weight ratio of the polyphenols to the total amount of the extract components (percentage by weight of the polyphenol(s)/percentage by weight of the total amount of the extract component(s)) is $20 \times 10^{-4}$ to $50 \times 10^{-4}$ (Examples 1 to 7).

The result of Comparative Example 1 was not desirable, since, although its astringency was not so strong, its taste lacked Shimari. Likewise, the result of Comparative Example 2 was not desirable, since, although its astringency was not so strong, it has less Shimari in the taste. Further, the result of Comparative Example 3 was not desirable, since, although it had Shimari in the taste, the astringency was undesirably strong.

Note that an assessment of quality similar to that performed for non-alcohol beer-taste beverages was performed in Examples 1 to 7 and Comparative Examples 1 to 3 at the time when the conditioned wort samples were prepared. The conditioned wort samples had Shimari in the taste in Examples 1 to 7, but the result of Comparative Example 1 was not desirable, since, although its astringency was not so strong, it does not have Shimari in the taste. Comparative Example 2 was also not desirable, since, although its astringency was not so strong, it had less Shimari in the taste. Further, Comparative Example 3 was undesirable, since although it had Shimari in the taste, its astringency was undesirably strong.

The invention claimed is:

1. A non-alcohol beer-taste beverage comprising extract component(s) derived from mugi and polyphenol(s) derived from mugi and/or hops, wherein a total amount of the extract component(s) is from 0.1 to 2% by weight inclusive, wherein a weight ratio of the polyphenol(s) to the total amount of the extract component(s) (percentage by weight of the polyphenol(s)/percentage by weight of the total amount of the extract component(s)) is from $20 \times 10^{-4}$ to $50 \times 10^{-4}$ inclusive, wherein the alcohol content of the non-alcohol beer-taste beverage is determined to be 0.00% (v/v) by rounding, wherein the non-alcohol beer-taste beverage is produced from wort, wherein the wort is made from mugi and hops as raw materials, and wherein the wort is prepared using hot water.

2. The non-alcohol beer-taste beverage according to claim 1, wherein the weight ratio of the polyphenol(s) to the total amount of the extract component(s) (percentage by weight of the polyphenol(s)/percentage by weight of the total amount of the extract component(s)) is from $20 \times 10^{-4}$ to $40 \times 10^{-4}$ inclusive.

3. The non-alcohol beer-taste beverage according to claim 1, wherein the weight ratio of the polyphenol(s) to the total amount of the extract component(s) (percentage by weight of the polyphenol(s)/percentage by weight of the total amount of the extract component(s)) is from $20 \times 10^{-4}$ to $30 \times 10^{-4}$ inclusive.

4. The non-alcohol beer-taste beverage according to claim 1, wherein the total amount of the extract components(s) is from 0.1 to 1% by weight inclusive.

5. The non-alcohol beer-taste beverage according to claim 1, wherein the total amount of the extract component(s) is from 0.1 to 0.5% by weight inclusive.

6. The non-alcohol beer-taste beverage according to claim 1, wherein the total amount of the extract component(s) is from 0.1 to 0.35% by weight inclusive.

7. The non-alcohol beer-taste beverage according to claim 1 having a calorie content of from 0.4 to 8 kcal/100 ml inclusive.

8. The non-alcohol beer-taste beverage according to claim 7 having a calorie content of from 0.4 to 4 kcal/100 ml inclusive.

9. The non-alcohol beer-taste beverage according to claim 7 having a calorie content of from 0.4 to 2 kcal/100 ml inclusive.

10. The non-alcohol beer-taste beverage according to claim 7 having a calorie content of from 0.4 to 1.4 kcal/100 ml inclusive.

11. The non-alcohol beer-taste beverage according to claim 1 having a saccharide content of from 0.1 to 2.0 g/100 ml inclusive.

12. The non-alcohol beer-taste beverage according to claim 11 having a saccharide content of from 0.1 to 1.0 g/100 ml inclusive.

13. The non-alcohol beer-taste beverage according to claim 11 having a saccharide content of from 0.1 to 0.5 g/100 ml inclusive.

14. The non-alcohol beer-taste beverage according to claim 11 having a saccharide content of from 0.1 to 0.35 g/100 ml inclusive.

15. The non-alcohol beer-taste beverage according to claim 1, which is a non-fermented, non-alcohol beer-taste beverage.

16. A production method for producing the non-alcohol beer-taste beverage according to claim 1, comprising a step of adding a seasoning component and carbon rich gas to wort having a weight ratio of a polyphenol(s) to the total amount of an extract component(s) (percentage by weight of the polyphenol(s)/percentage by weight of the total amount of the extract component(s)) that is from $20 \times 10^{-4}$ to $50 \times 10^{-4}$ inclusive.

17. The production method according to claim 16, wherein the weight ratio of the polyphenol(s) to the total amount of the extract component(s) (percentage by weight of the polyphenol(s)/percentage by weight of the total amount of the extract component(s)) in the wort is from $20 \times 10^{-4}$ to $40 \times 10^{-4}$ inclusive.

18. The production method according to claim 16, wherein the weight ratio of the polyphenol(s) to the total amount of the extract component(s) (percentage by weight of the polyphenol(s)/percentage by weight of the total amount of the extract component(s)) in the wort is from $20 \times 10^{-4}$ to $30 \times 10^{-4}$ inclusive.

19. The production method according to claim 16, wherein the wort is obtained by adding pelletized hops to a wort filtrate and boiling the wort filtrate.

20. The production method according to claim 16, wherein the beer-taste beverage is a non-fermented, non-alcohol beer-taste beverage.

* * * * *